(12) United States Patent
Kerness et al.

(10) Patent No.: US 9,354,111 B2
(45) Date of Patent: May 31, 2016

(54) WAFER LEVEL LENS IN PACKAGE

(71) Applicant: Maxim Integrated Products, Inc., San Jose, CA (US)

(72) Inventors: Nicole D. Kerness, Menlo Park, CA (US); Arkadii V. Samoilov, Saratoga, CA (US); Jerome C. Bhat, Palo Alto, CA (US); Anand Chamakura, San Jose, CA (US); Kumar Nagarajan, Cupertino, CA (US); Christopher F. Edwards, Sunnyvale, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 84 days.

(21) Appl. No.: 14/277,263

(22) Filed: May 14, 2014

(65) Prior Publication Data

US 2015/0109785 A1   Apr. 23, 2015

Related U.S. Application Data

(60) Provisional application No. 61/892,525, filed on Oct. 18, 2013.

(51) Int. Cl.
| | |
|---|---|
| *F21V 14/00* | (2006.01) |
| *G01J 1/04* | (2006.01) |
| *G01J 1/02* | (2006.01) |
| *G01J 1/08* | (2006.01) |
| *G01J 1/42* | (2006.01) |

(52) U.S. Cl.
CPC .............. *G01J 1/0411* (2013.01); *G01J 1/0271* (2013.01); *G01J 1/08* (2013.01); *G01J 1/4204* (2013.01)

(58) Field of Classification Search
CPC ............ F21V 23/00; F21V 33/00; G01J 3/00; G01J 1/0271; G01J 1/04; G01J 1/0411; G01J 1/08

USPC .................................................. 362/253, 255
See application file for complete search history.

(56) References Cited

U.S. PATENT DOCUMENTS

| | | | | |
|---|---|---|---|---|
| 5,138,150 | A * | 8/1992 | Duncan ................. | G01S 17/026 250/221 |
| 6,432,744 | B1 * | 8/2002 | Amador .............. | H01L 21/4846 257/E21.508 |
| 8,836,924 | B2 * | 9/2014 | Popp ....................... | G01S 17/36 356/3.01 |
| 2004/0136715 | A1 * | 7/2004 | Kondo ..................... | G02B 6/43 398/82 |
| 2006/0001761 | A1 * | 1/2006 | Haba .................. | H01L 27/14618 348/340 |
| 2009/0212407 | A1 * | 8/2009 | Foster ................... | B81B 7/0006 257/686 |

(Continued)

*Primary Examiner* — Ali Alavi
(74) *Attorney, Agent, or Firm* — Advent, LLP

(57) ABSTRACT

A wafer level optical device, system, and method are described that include a substrate, an electronic device disposed on the substrate, an illumination source disposed on the electronic device, an enclosure disposed on the substrate, where the enclosure includes at least one optical surface and covers the electronic device and the illumination source, and at least one solder ball disposed on a side of the substrate distal from the electronic device. In implementations, a process for using the wafer level optical device and lens-integrated package system that employ the techniques of the present disclosure includes receiving a substrate, placing an electronic device on the substrate, placing an illumination source on the electronic device, and placing an enclosure on the substrate, where the enclosure covers the electronic device and the illumination source, and the enclosure and a wall structure form a first compartment and a second compartment.

19 Claims, 4 Drawing Sheets

(56) References Cited

U.S. PATENT DOCUMENTS

| | | | |
|---|---|---|---|
| 2011/0266446 A1* | 11/2011 | Chang | G01J 1/32 250/338.4 |
| 2014/0035812 A1* | 2/2014 | Skurnik | G06F 3/017 345/156 |
| 2014/0091326 A1* | 4/2014 | Tran | H01L 33/58 257/81 |
| 2015/0097633 A1* | 4/2015 | DeVries | H01L 23/66 333/33 |
| 2015/0346897 A1* | 12/2015 | Irri | G06F 3/0421 345/175 |

* cited by examiner

WAFER LEVEL LENS IN PACKAGE

BACKGROUND

Electronic devices, such as smart phones, tablet computers, digital media players, and so forth, increasingly employ light sensors to control the manipulation of a variety of functions provided by the device. For example, light sensors are commonly used by electronic devices to detect ambient lighting conditions in order to control the brightness of the device's display screen. Typical light sensors employ photodetectors such as photodiodes, phototransistors, or the like, which convert received light into an electrical signal (e.g., a current or voltage).

Light sensors are commonly used in Infrared (IR)-based sensing devices, such as gesture sensing devices. Gesture sensing devices enable the detection of physical movement (e.g., "gestures") without the user actually touching the device within which the gesture sensing device resides. The detected movements can be subsequently used as input commands for the device. In implementations, the electronic device is programmed to recognize distinct non-contact hand motions, such as left-to-right, right-to-left, up-to-down, down-to-up, in-to-out, out-to-in, and so forth. Gesture sensing devices have found popular use in handheld electronic devices, such as tablet computing devices and smart phones, as well as other portable electronic devices, such as laptop computers, video game consoles, and so forth.

SUMMARY

A wafer level optical device, system, and method are described that include a substrate, an electronic device disposed on the substrate, an illumination source disposed on the electronic device, an enclosure disposed on the substrate, where the enclosure includes at least one optical surface and covers the electronic device and the illumination source, and at least one solder ball disposed on a side of the substrate distal from the electronic device. In an implementation, a lens-integrated package system includes a printed circuit board and a wafer-lens device. In implementations, a process for using the wafer level optical device and lens-integrated package system that employ the techniques of the present disclosure includes receiving a substrate, placing an electronic device on the substrate, placing an illumination source on the electronic device, and placing an enclosure on the substrate, where the enclosure covers the electronic device and the illumination source, and the enclosure and a wall structure form a first compartment and a second compartment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Gesture, optical, biological, or proximity sensing devices often include light sensing devices to allow for detection of light and/or physical movement in proximity to the sensing devices. These light sensing devices are configured to detect light (e.g., electromagnetic radiation) that is generated from an illumination source and reflected from an object, such as a finger or a hand, in proximity to the sensor. Sometimes light sensing devices include a sensor as well as other components (e.g., a light source). As components are added to the light sensor, space, size of the sensor footprint, reliability, and optics quality are concerns.

Accordingly, a wafer level optical device, system, and method are described that include a substrate, an electronic device disposed on the substrate, an illumination source disposed on the electronic device, an enclosure disposed on the substrate, where the enclosure includes at least one optical surface, one or more lenses (e.g., over the source and electronic device) and covers the electronic device and the illumination source, and at least one solder ball (or other means to electrically connect to the device) disposed on a side of the substrate distal from the electronic device. In an implementation, a lens-integrated package system includes a printed circuit board and a wafer level-lens device. In implementations, a process for using the wafer level optical device and lens-integrated package system that employ the techniques of the present disclosure includes receiving a substrate, placing an electronic device on the substrate, placing an illumination source on the electronic device, and placing an enclosure on the substrate, where the enclosure covers the electronic device and the illumination source, and the enclosure and a wall structure forms a first compartment and a second compartment. The wafer level optical device is not limited to gesture sensors, but can also be used for medical or other wavelength dependent sensors (e.g., optical sensors, IR sensors, biosensors, such as heart rate and pulse oximetry etc.).

Example Implementations

Figure 1A:
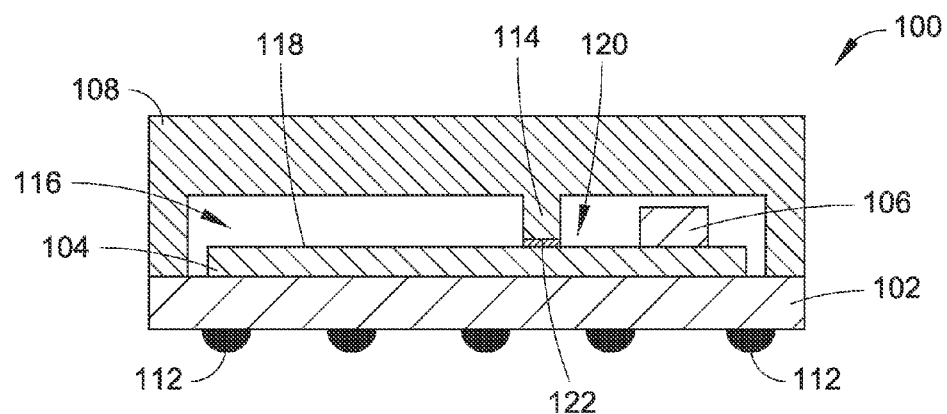
FIG. 1A is a diagrammatic cross-sectional view illustrating a wafer level optical device that includes an illumination source disposed on an electronic device, such as a sensor, in accordance with an example implementation of the present disclosure.
Figure 1B:
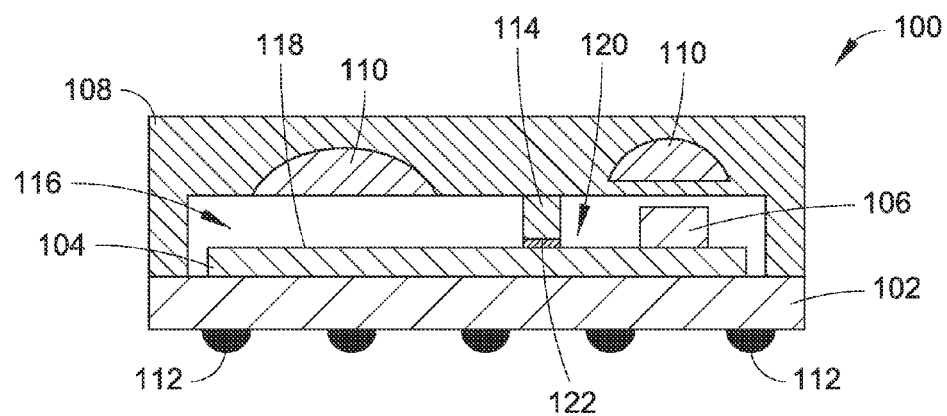
FIG. 1B is a diagrammatic cross-sectional view illustrating a wafer level optical device that includes an illumination source disposed on an electronic device, such as a sensor, in accordance with an example implementation of the present disclosure. In this case a lens with one or two surfaces can be included.
Figure 1C:
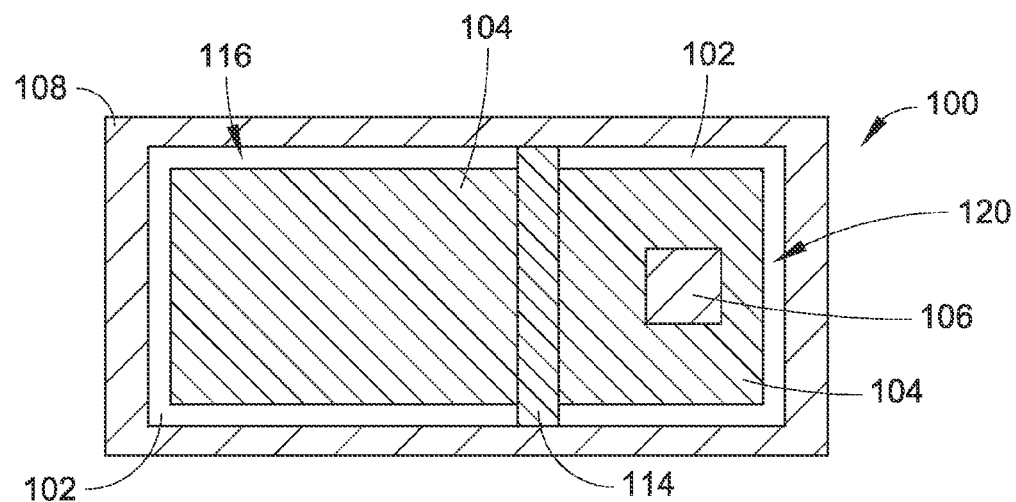
FIG. 1C is a diagrammatic top plan view illustrating a wafer level optical device that includes an illumination source disposed on an electronic device, such as a sensor, in accordance with an example implementation of the present disclosure.

FIGS. 1A through 1C illustrate a wafer level optical device 100 in accordance with an example implementation of the present disclosure. As shown in FIGS. 1A through 1C, the wafer level optical device 100 includes a substrate 102. In some implementations, the substrate 102 can include a printed circuit board with routing. A printed circuit board can include a board that mechanically supports and electrically connects electronic components using conductive tracks, pads and other features etched from copper sheets laminated onto a non-conductive substrate. In an embodiment, the substrate 102 can include a printed circuit board that has routing configured to provide electrical connections for an electronic device 104. In other implementations, the substrate 102 can include a ceramic material (e.g., ceramic, a glass converted to ceramic, ceramic with metal for mechanical support and/or electrical interconnections, etc.). In yet other implementations, a substrate 102 may include a wafer, such as a semiconductor wafer and/or a carrier wafer, and/or an integrated circuit chip. Additionally, the substrate 102 may include electrical interconnections formed therein (e.g., integrated circuits, redistribution layers, vias, contact pads, etc.).

In some implementations, at least one solder bump 112 can be formed on the substrate 102. Solder bumps 112 can be provided to furnish mechanical and/or electrical interconnection between the substrate 102 and corresponding contacts formed on the surface of a printed circuit board (e.g., in a lens-integrated package system) or another semiconductor/electrical device. In one or more implementations, the solder bumps 112 may be fabricated of a lead-free solder such as a Tin-Silver-Copper (Sn—Ag—Cu) alloy solder (i.e., SAC), a Tin-Silver (Sn—Ag) alloy solder, a Tin-Copper (Sn—Cu) alloy solder, and so on. In some implementations, Tin-Lead (PbSn) solders may be used. In other implementations, other means may be used to attach and/or secure the wafer level optical device 100 to another device. For example, and adhesive may be used instead of or in addition to the at least one solder bump 112.

As illustrated in FIGS. 1A through 1C, the wafer level optical device 100 includes an electronic device 104 disposed on the substrate 102. In implementations, the electronic device 104 can include a semiconductor device, such as an integrated circuit chip. In an embodiment, the semiconductor device can include a sensor (e.g., optically active elements formed on a side of the semiconductor device). In these embodiments, an example sensor can include a photo sensor device (e.g., photodetector) configured to detect electromagnetic radiation occurring within a limited spectrum of wavelengths (e.g., infrared light, visible light, etc.). The sensor(s) used as an electrical device 104 can be configured for different applications, such as a gesture sensor, a biological sensor, and/or other optical sensors, for example. Additionally, the electronic device 104 can include a device where a portion of a side of the electronic device 104 includes an optically active portion 118 (e.g., a sensor portion) and another portion of the side of the electronic device 104 includes a non-optically active portion. The electronic device 104 can be secured to the substrate 102 in a variety of ways. In one embodiment, the electronic device 104 can be secured and electrically connected to the substrate 102 using wirebonding, which includes using wires to connect the electronic device 104 to the substrate 102. In another embodiment, the electronic device 104 can be connected to the substrate using an array of contact pads, a redistribution layer, and/or solder balls 112. It is contemplated that other methods may be used to secure the electronic device 104 to the substrate 102, such as using an adhesive. In some embodiments, the electronic device 104 can include a processor configured to perform digital processing.

As illustrated in FIGS. 1A through 1C, the wafer level optical device 100 includes an illumination source 106 disposed on the electronic device 104. In implementations, the illumination source 108 is disposed on the non-optically active portion of the electronic device 104. The illumination source 108 may be secured to the electronic device 104 using different methods, such as using wirebonding or solder bumps, on a location of the electronic device 104 that includes circuitry configured to electrically connect the illumination source 106 to the electronic device 106. In one embodiment, an illumination source 106 is placed on the electronic device 104 using a bumping and reflow process where an array of solder bumps disposed on a side of the illumination source 106 is used to secure and attach the illumination source 106 to the electronic device 104. In another embodiment, the illumination source 106 is secured to the electronic device 104 using an adhesive and wirebonding. Placing the illumination source 106 on the surface of the electronic device 104 can function to decrease the size and footprint of the wafer level optical device 100.

The illumination source 106 can include different devices. In implementations, the illumination source 106 can include a light-emitting diode, a vertical-cavity surface-emitting laser (VCSEL), a sensor, and/or another laser diode. In one embodiment, the illumination source 106 includes a vertical-cavity surface-emitting laser, which includes a semiconductor laser diode with laser beam emission perpendicular from the top surface of the VCSEL. Other examples of an illumination source 106 can include light sources in the visible light and/or the non-visible light range.

As illustrated in FIGS. 1A through 1C, the wafer level optical device 100 includes an enclosure 108 disposed on the substrate 102 and covering the electronic device 104 and illumination source 106. In implementations, the enclosure 108 can include a structure that covers but does not contact the electronic device 104 and/or the illumination source 106. For example, the enclosure 108 can include a substantially light-blocking epoxy material formed as an enclosure and covering the electronic device 104 and illumination source 106, as illustrated in FIGS. 1A through 1C. In one embodiment, the enclosure 108 can include an antireflection layer disposed on at least one surface.

Additionally, the enclosure 108 can include at least one lens 110. In some implementations and as shown in FIG. 1B, the lens(es) 110 can be placed on and/or as a part of the enclosure 108. The lens 110 can be placed so that alignment with the optically active portion 118 of the electronic device 104 is achieved (e.g., by using at least one alignment target). In one embodiment, a lens 110 configured to be placed in the enclosure 108 is aligned with the optically active portion 118 of the electronic device 104. In this embodiment, a second lens 110 can be configured to be aligned with an illumination source 106, where both of the lenses are disposed in the enclosure 108. A lens 110 may include a device that can transmit and/or refract light, such as a ball lens, a Fresnel lens, and/or other diffractive optics element lenses. Further, the lens 110 may be disposed on the enclosure 108 or as a portion of the enclosure 108 (e.g., embedded in and/or formed from the materials of the enclosure 108). In embodiments, the lens 110 includes an upward surface and/or a lower surface that forms a two surface lens 110. In some implementations, the enclosure 108 can include two or more lenses depending on the number of electronic devices 104 (e.g., sensors) and/or illumination sources (e.g., LEDs, VCSELs, etc.). Additionally, the lens(es) 110 can be placed at different positions as a portion of the enclosure 108 (e.g., the lens 110 may be near the surface close to an illumination source 106, the lens 110 may be distal from the illumination source 106, etc.). In one specific embodiment, a wafer level optical device 100 includes two polymer lenses formed as a portion of an enclosure 108, where one lens 110 is aligned over a sensor portion of an electronic device 104 disposed on a printed circuit board substrate 102, and the second lens 110 is aligned over a vertical-cavity surface-emitting laser illumination source 106 disposed on the electronic device 104. In another embodiment, the enclosure 108 can include two lenses 110, where the two lenses 108 are configured to be stacked over a single illumination source 106, and/or an active portion of a sensor (e.g., an active portion of the electronic device 104). In a further embodiment and as shown in FIG. 1A, the enclosure 108 does not include any lenses 110.

In an additional embodiment, the enclosure 108 can include a silicon window or a filter. In this embodiment, the silicon window or filter can selectively allow certain light wavelengths to pass through. In one example, the silicon window or filter can allow between 1 µm and 10 µm wavelength light to pass through. Using a silicon window or a filter can allow utilization of a thermopile device within the wafer level optical device 100, for example.

Additionally, the wafer level optical device 100 includes a wall structure 114. The wall structure 114 can be disposed between a first compartment 116 and a second compartment 120, where the first compartment 116 and the second compartment 120 are optically isolated from each other. In implementations, the first compartment 116 and the second compartment 120 are defined by the enclosure 108, the electronic device 104, the illumination source 106, and a portion of the substrate 102. The first compartment 116 and/or the second compartment 120 may be filled with air, helium, and/or an inert gas. In one embodiment, the wall structure is formed as a portion of the enclosure 108 (e.g., formed from at least a portion of a leadframe) and placed to form the first compartment 116 and the second compartment 120 when the enclosure 108 is placed on the substrate 102 and over the electronic device 104 and the illumination source 106. In another embodiment, the wall structure 114 may be formed on the electronic device 104 prior to placing the enclosure 108, for example, using a deposition process. The wall structure 114 may serve to partially define the first compartment 116 and the second compartment 120 and may function to optically isolate and prevent "cross-talk" (e.g., optical communication within the transparent enclosure) between the illumination source 106 and the optically active portion 118 of the electronic device 104. Further, a light-blocking material 122 may be disposed between wall structure 114 and electronic device 104 for blocking light between the first compartment 116 and the second compartment 120. In some implementations, the light-blocking material 114 can include a non-transparent glue, etc.

In one embodiment, the wall structure 114 includes an epoxy material that is configured to prevent light from passing (e.g., a substantially opaque epoxy) to the electronic device 104 from the illumination source 106 within the space between the enclosure 108 and the electronic device 104 and illumination source 106. In another embodiment, the wall structure 114 includes a metal lead frame. In another embodiment, the wall structure 114 can include a metal pole or wall formed in a glass wafer where at least a portion of the glass has been removed to expose the metal pole or wall. In other embodiments, the wall structure 114 can include glass converted to ceramic, printed circuit board, glass that is translucent or opaque, and/or metal.

Example Processes

Figure 2:
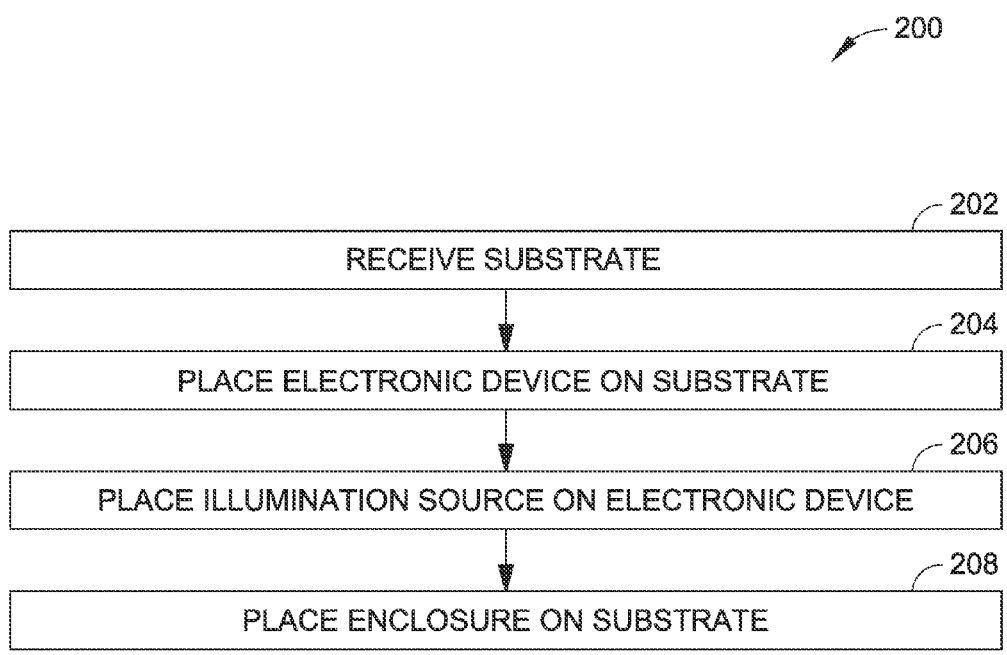
FIG. 2 is a flow diagram illustrating an example process for fabricating a wafer level optical device, such as the wafer level optical device illustrated in FIGS. 1A through 1C.
Figure 3A:
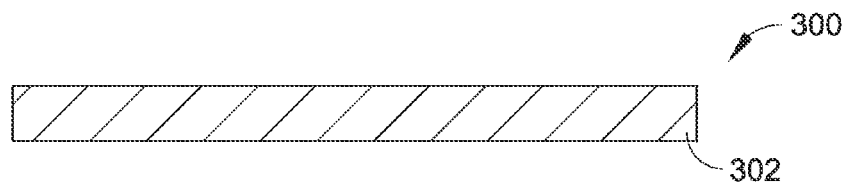
FIG. 3A is a diagrammatic partial cross-sectional side elevation view illustrating the fabrication of a wafer level optical device, such as the device shown in FIGS. 1A and 1B, in accordance with the process shown in FIG. 2.
Figure 3B:
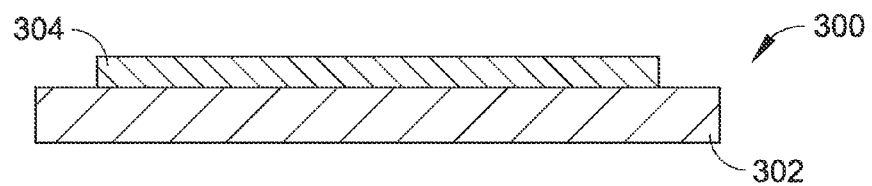
FIG. 3B is a diagrammatic partial cross-sectional side elevation view illustrating the fabrication of a wafer level optical device, such as the device shown in FIGS. 1A and 1B, in accordance with the process shown in FIG. 2.
Figure 3C:
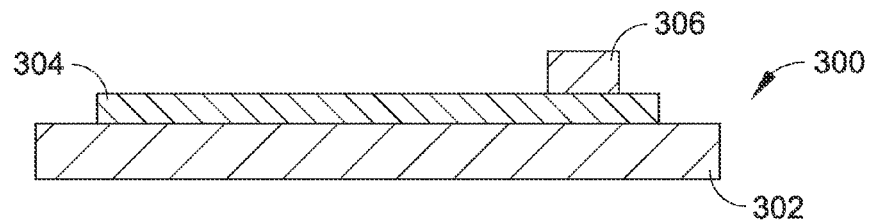
FIG. 3C is a diagrammatic partial cross-sectional side elevation view illustrating the fabrication of a wafer level optical device, such as the device shown in FIGS. 1A and 1B, in accordance with the process shown in FIG. 2.
Figure 3D:
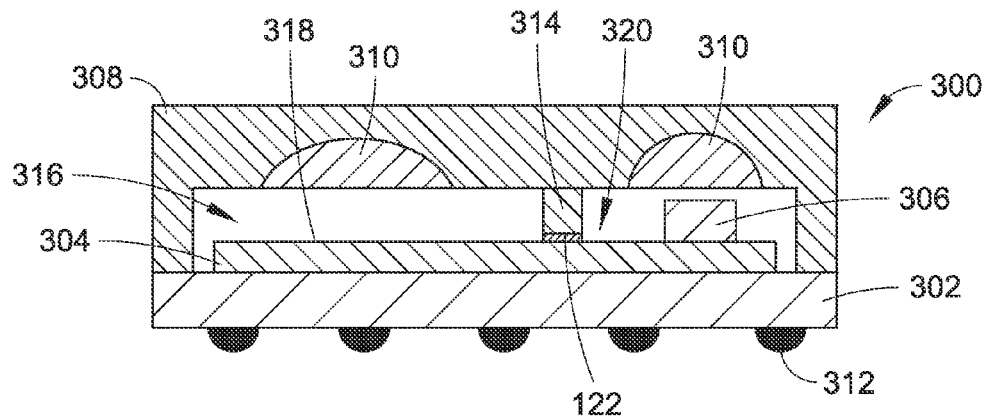
FIG. 3D is a diagrammatic partial cross-sectional side elevation view illustrating the fabrication of a wafer level optical device, such as the device shown in FIGS. 1A and 1B, in accordance with the process shown in FIG. 2.

FIG. 2 illustrates an example process 200 that employs a lens-integrated package and system. The process 200 employs a wafer level optical device 100, such as the wafer level optical device 100 shown in FIGS. 1A through 1C.

In the process 200 illustrated, a substrate is received (Block 202). In implementations, receiving a substrate 302 can include receiving a pre-fabricated substrate 302. Receiving the substrate 302 can include receiving a printed circuit board, a ceramic substrate 302, and/or receiving a carrier wafer substrate 302.

An electronic device is placed on the substrate (Block 204). In implementations, placing the electronic device 304 can include placing an integrated circuit chip or a sensor on the substrate 302. The electronic device may be placed using pick-and-place methods. Pick-and-place technology may include using automated machines to place surface-mount devices (e.g., the electronic device 304) onto a substrate 302 (e.g., a printed circuit board).

Then, an illumination source is placed on the electronic device (Block 206). In implementations, placing an illumination source 106 can include placing a light-emitting diode and/or a vertical-cavity surface-emitting laser on the electronic device 304. Placing the illumination source 306 on the electronic device 304 can include using pick-and-place methods. In an embodiment, pick-and-place technology may include using automated machines to place an illumination source 306 (e.g., an LED and/or other light source) onto an electronic device 304 (e.g., an integrated circuit and/or a sensor device).

An enclosure is placed on the substrate where the enclosure covers the electronic device and the illumination device (Block 208). In implementations, placing an enclosure 308 on the substrate 302 may include placing the enclosure 308 such that it covers the electronic device 304 and the illumination source 306. Additionally, placing the enclosure 308 on the substrate 302 may include placing and/or forming a wall structure 314. Placing and/or forming the wall structure 314 can define a first compartment 316 and a second compartment 320. Additionally, placing an enclosure 308 on the substrate 302 can include placing an enclosure 308 having a lens 310 formed therein, forming the lens 310 within the body of the enclosure 308, and/or placing a lens 310 on the enclosure 308. In one embodiment, the enclosure 308 can be formed at least partially using a leadframe, where a portion of the leadframe disposed toward the middle of the leadframe may be partially formed and developed into the wall structure 314.

Following fabrication of the wafer level optical device 100 and system, the wafer level optical device 100 may be further combined with a printed circuit board to form a lens-integrated package system, which may be used in other systems, such as mobile phones and/or computing systems.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A wafer level optical device, comprising:
a substrate;
an electronic device disposed on the substrate, the electronic device comprising an integrated circuit chip;
an illumination source disposed on the electronic device;
an enclosure disposed on the substrate, the enclosure including at least one optical surface, where the enclosure covers the electronic device and the illumination source; and
at least one solder ball disposed on a side of the substrate distal from the electronic device.

2. The wafer level optical device as recited in claim 1, wherein the substrate comprises a printed circuit board with routing.

3. The wafer level optical device as recited in claim 1, wherein the enclosure includes at least one of a silicon window or a filter, where the at least one silicon window or filter allows between 1 µm and 10 µm wavelength light to pass through.

4. The wafer level optical device as recited in claim 1, wherein the electronic device includes a sensor.

5. The wafer level optical device as recited in claim 4, wherein the electronic device includes multiple sensors.

6. The wafer level optical device as recited in claim 1, wherein the electronic device includes a digital processor.

7. The wafer level optical device as recited in claim 1, wherein the illumination source includes a light-emitting diode.

8. The wafer level optical device as recited in claim 1, wherein the illumination source includes a vertical-cavity surface-emitting laser.

9. The wafer level optical device as recited in claim 1, wherein the illumination source includes a sensor disposed on the electronic device.

10. The wafer level optical device as recited in claim 1, wherein the enclosure includes at least one lens.

11. The wafer level optical device as recited in claim 10, wherein the at least one lens is aligned with an optically active portion of the electronic device.

12. A lens-integrated package system, comprising:
a printed circuit board; and
a wafer level optical device disposed on the printed circuit board, the wafer level optical device including
a substrate;
an electronic device disposed on the substrate, the electronic device comprising an integrated circuit chip;
an illumination source disposed on the electronic device;
an enclosure disposed on the substrate, the enclosure including at least two lenses and at least one optical surface, where the enclosure covers the electronic device and the illumination source; and
at least one solder ball disposed on a side of the substrate distal from the electronic device.

13. The lens-integrated package system as recited in claim 12, wherein the illumination source includes a vertical-cavity surface-emitting laser.

14. The lens-integrated package system as recited in claim 12, wherein the electronic device includes a sensor.

15. The lens-integrated package system as recited in claim 12, wherein the illumination source includes a light-emitting diode.

16. A process, comprising:
receiving a substrate;
placing an electronic device on the substrate, the electronic device comprising an integrated circuit chip;
placing an illumination source on the electronic device; and
placing an enclosure on the substrate, where the enclosure covers the electronic device and the illumination source, and the enclosure and a wall structure form a first compartment and a second compartment.

17. The process as recited in claim 16, wherein placing an enclosure on the substrate includes placing an enclosure that includes at least one lens.

18. The process as recited in claim 16, wherein the first compartment houses a sensor portion of the electronic device and the second compartment houses the illumination source.

19. The process as recited in claim 16, wherein placing the illumination source includes placing a light-emitting diode.

* * * * *